US008122363B1

(12) United States Patent
Appelman

(10) Patent No.: US 8,122,363 B1
(45) Date of Patent: Feb. 21, 2012

(54) PRESENCE STATUS INDICATOR

(75) Inventor: Barry Appelman, McLean, VA (US)

(73) Assignee: AOL Inc., Dulles, VA (US)

( * ) Notice: Subject to any disclaimer, the term of this patent is extended or adjusted under 35 U.S.C. 154(b) by 3145 days.

(21) Appl. No.: 09/848,231

(22) Filed: May 4, 2001

Related U.S. Application Data

(60) Provisional application No. 60/201,738, filed on May 4, 2000, provisional application No. 60/229,311, filed on Sep. 1, 2000.

(51) Int. Cl.
G06F 3/00 (2006.01)

(52) U.S. Cl. ........ 715/752; 715/758; 715/753; 709/206; 709/203

(58) Field of Classification Search .......... 715/752–753; 709/206, 203; 345/752, 758, 751, 753
See application file for complete search history.

(56) References Cited

U.S. PATENT DOCUMENTS

| | | | |
|---|---|---|---|
| 5,276,905 A | 1/1994 | Hurst et al. | |
| 5,327,486 A | 7/1994 | Wolff et al. | |
| 5,533,110 A | 7/1996 | Pinard et al. | |
| 5,557,659 A | 9/1996 | Hyde-Thomson | |
| 5,608,786 A | 3/1997 | Gordon | |
| 5,721,906 A | 2/1998 | Siefert | |
| 5,742,905 A | 4/1998 | Pepe et al. | |
| 5,774,670 A | 6/1998 | Montulli | |
| 5,793,365 A | 8/1998 | Tang et al. | |
| 5,802,470 A | 9/1998 | Gaulke et al. | |
| 5,850,594 A | 12/1998 | Cannon et al. | |
| 5,867,162 A | 2/1999 | O'Leary et al. | |
| 5,870,744 A | 2/1999 | Sprague | |
| 5,872,521 A | 2/1999 | Lopatukin et al. | |
| 5,878,219 A | 3/1999 | Vance, Jr. et al. | |
| 5,893,091 A | 4/1999 | Hunt et al. | |
| 5,893,099 A | 4/1999 | Schreiber et al. | |
| 5,920,692 A | 7/1999 | Nguyen et al. | |
| 5,940,488 A | 8/1999 | DeGrazia et al. | |
| 5,948,058 A * | 9/1999 | Kudoh et al. | 709/206 |
| 5,951,643 A | 9/1999 | Shelton et al. | |
| 5,951,652 A | 9/1999 | Ingrassia, Jr. et al. | |
| 5,954,798 A | 9/1999 | Shelton et al. | |
| 5,960,173 A | 9/1999 | Tang et al. | |
| 5,991,791 A | 11/1999 | Siefert | |
| 6,009,413 A | 12/1999 | Webber et al. | |
| 6,012,051 A | 1/2000 | Sammon, Jr. et al. | |
| 6,014,135 A | 1/2000 | Fernandes | |

(Continued)

FOREIGN PATENT DOCUMENTS

EP 0862304 A2 9/1998

(Continued)

OTHER PUBLICATIONS

Eschenburg, Wo laufen sie denn?, Oct. 26, 1998, pp. 92-95.

(Continued)

*Primary Examiner* — Simon Ke

(74) *Attorney, Agent, or Firm* — Finnegan, Henderson, Farabow, Garrett & Dunner LLP

(57) ABSTRACT

Systems and techniques for transferring electronic data between users of a communication system by delivering an e-mail message from a sender to at least one recipient and indicating the online state of at least one of the sender and any other recipient of the e-mail message upon opening of the e-mail message by the recipient.

55 Claims, 9 Drawing Sheets

U.S. PATENT DOCUMENTS

| | | | |
|---|---|---|---|
| 6,014,638 | A | 1/2000 | Burge et al. |
| 6,026,403 | A | 2/2000 | Siefert |
| 6,026,429 | A | 2/2000 | Jones et al. |
| 6,065,047 | A | 5/2000 | Carpenter et al. |
| 6,081,830 | A * | 6/2000 | Schindler ............... 709/204 |
| 6,085,223 | A | 7/2000 | Carino, Jr. et al. |
| 6,151,584 | A | 11/2000 | Papierniak et al. |
| 6,166,730 | A | 12/2000 | Goode et al. |
| 6,260,148 | B1 | 7/2001 | Aggarwal et al. |
| 6,269,369 | B1 | 7/2001 | Robertson |
| 6,301,609 | B1 | 10/2001 | Aravamudan et al. |
| 6,374,246 | B1 | 4/2002 | Matsuo |
| 6,389,127 | B1 | 5/2002 | Vardi et al. |
| 6,415,318 | B1 | 7/2002 | Aggarwal et al. |
| 6,425,012 | B1 | 7/2002 | Trovato et al. |
| 6,430,604 | B1 | 8/2002 | Ogle et al. |
| 6,446,112 | B1 * | 9/2002 | Bunney et al. ............. 709/204 |
| 6,449,344 | B1 | 9/2002 | Goldfinger et al. |
| 6,449,634 | B1 | 9/2002 | Capiel ...................... 709/206 |
| 6,501,834 | B1 | 12/2002 | Milewski et al. |
| 6,525,747 | B1 * | 2/2003 | Bezos ...................... 345/751 |
| 6,535,586 | B1 | 3/2003 | Cloutier et al. |
| 6,549,937 | B1 | 4/2003 | Auerbach et al. |
| 6,640,230 | B1 * | 10/2003 | Alexander et al. ........... 707/10 |
| 6,678,719 | B1 | 1/2004 | Stimmel |
| 6,731,308 | B1 | 5/2004 | Tang et al. |
| 6,750,881 | B1 | 6/2004 | Appelman |
| 6,772,188 | B1 | 8/2004 | Cloutier |
| 6,788,769 | B1 | 9/2004 | Waites |
| 6,901,559 | B1 | 5/2005 | Blum et al. |
| 6,912,563 | B1 | 6/2005 | Parker et al. |
| 6,917,965 | B2 | 7/2005 | Gupta et al. |
| 7,076,546 | B1 * | 7/2006 | Bates et al. ................ 709/224 |
| 7,149,208 | B2 * | 12/2006 | Mattaway et al. ........... 370/352 |
| 2001/0005861 | A1 | 6/2001 | Mousseau et al. |
| 2002/0015061 | A1 | 2/2002 | Maguire |
| 2002/0021307 | A1 * | 2/2002 | Glenn et al. ............... 345/753 |
| 2002/0042816 | A1 * | 4/2002 | Bae ............................ 709/206 |
| 2002/0065894 | A1 | 5/2002 | Dalal et al. |
| 2002/0133369 | A1 | 9/2002 | Johnson |
| 2002/0147777 | A1 | 10/2002 | Hackbarth et al. |
| 2002/0175953 | A1 | 11/2002 | Lin |
| 2002/0184089 | A1 | 12/2002 | Tsou et al. |
| 2003/0004872 | A1 | 1/2003 | Gardi et al. |
| 2003/0028524 | A1 | 2/2003 | Keskar et al. |
| 2003/0037112 | A1 | 2/2003 | Fitzpatrick |
| 2003/0043201 | A1 | 3/2003 | Abdelhadi et al. |
| 2003/0140103 | A1 * | 7/2003 | Szeto et al. ................ 709/206 |
| 2005/0027382 | A1 | 2/2005 | Kirmse et al. |
| 2010/0184517 | A1 * | 7/2010 | Danieli et al. ................ 463/42 |

FOREIGN PATENT DOCUMENTS

| | | |
|---|---|---|
| EP | 1176840 A1 | 1/2002 |
| GB | 2357932 A | 7/2001 |
| WO | WO 97/10558 | 3/1997 |
| WO | WO 97/46955 | 12/1997 |
| WO | WO 98/16045 | 4/1998 |
| WO | WO 99/08434 | 2/1999 |
| WO | 01/06748 A | 1/2001 |
| WO | 02/03216 A | 1/2002 |
| WO | 02/073886 | 9/2002 |

OTHER PUBLICATIONS

Kohda et al., IMPP: A New Instant Messaging Standard and Its Impact on Internet Business, Dec. 2000, Fujitsu Sci. Tech. J., 36, 2, pp. 147-153.

"AOL technology: turning complicated things into engaging services", 1996 Annual Report, 22 pages.

"YAHOO! Messenger Makes the World a Little Smaller, More Informed", pp. 1-2, Jun. 21, 1999.

Alan Cohen, "Instant Messaging", Apr. 13, 1999, PC Magazine, PC Labs, 2 pages.

"AOL Instant Messenger Windows Beta Features", Jun. 24, 1999, 2 pgs, AOL Instant Messenger All New Version 2.0, 2 pages, Jun. 24, 1999, What is AOL Instant Messenger, 3 pages, Jun. 24, 1999, Quick Tips for Getting Started, 5 pages, Jun. 24, 1999, Frequently Asked Questions About AOL Instant Messenger, 6 pages, Jun. 24, 1999.

"What new about exchanging information over the Internet," Outlook 2000 SR-1 (9.0.0.4527) Help File, on or before Aug. 10, 2001, p. 1.

"About Internet directory services," Outlook 2000 SR-1 (9.0.0.4527) Help File, on or before Aug. 10, 2001, p. 1.

"Set up LDAP directory services," Outlook 2000 SR-1 (i.0.0.4527) Help File, on or before Aug. 10, 2001, p. 1.

"Look up contact information from an item," Outlook 2000 SR-1 (9.0:0.4527) Help File, on or before Aug. 10, 2001, p. 1.

J.C. Cannon, "Design Guide for Directory-Enabled Applications," [online], Apr. 2001 [retrieved on May 13, 2003]. Retrieved from the Internet http://msdn.microsoft.com/library/enus/dnactdir/html/BuildingADApps.asp?frame=true, pp. 1-9.

Microsoft Corporation, "Using ADSI, LDAP, and Network management Functions With Active Directory," [online], Feb. 2002 [retrieved on May 13, 2003]. Retrieved from the Internet http://msdn.microsoft.com/library/enus/dnactdir/html/BuildingADApps.asp?frame=true, pp. 1-9.

Microsoft Corporation, "Comparing Microsoft Active Directory to Novell's NDS," [online], Sep. 1998 [retreieved on May 13, 2003]. Retrieved from the Internet http://msdn.mircosoft.-com/library/enus/dnactdir/html/msdn_activedirvsnds.asp?frame=true, pp. 1-17.

Microsoft Corporation, "Active Directory Services Interface in the Microsoft Exchange 5.5 Environment," [online], Nov. 1997 [retrieved on May 13, 2003]. Retrieved from the Internet http://msdn.microsoft.com/library/enus/dnactdir/html/msdn_adsiexch.asp?frame=true, pp. 1-12.

"Active Directory Service Overview," [online], Nov. 30, 2001 [retrieved on May 13, 2003]. Retrieved from the Internet http://www.microsoft.com/windows2000/server/eveluation/business/-ad-datasheet.asp, pp. 105.

"Integrating Microsoft Metadirectory Services and Active Directory," [online], Aug. 31, 2000 [retrieved on May 13, 2003]. Retrieved from the Internet http://www.microsoft.com/windows2000/-server/evalution/business/adwin2k.asp, p. 1.

"Benefits of Active Directory in a Windows 2000 Environment," [online], Sep. 20, 2001 [retrieved on May 13, 2003]. Retrieved from the Internet http://www.microsoft.com/windows2000/-server/evaluation/business/adwin2.k.asp, pp. 1-9.

"Active Directory," [online], retrieved on May 13, 2003]. Retrieved from the Internet http://www.microsoft.com/windows2000/technologies/directory/AD/default.asp, pp. 1-13.

Microsoft Corporation, "Introduction to Active Directory Application Mode," Microsoft Windows Server 2003, Aug. 2002, pp. 1-13.

"Active Directory Features," [online], Jun. 15, 1999 [retrieved on May 13, 2003]. Retrieved from the Internet http://www.microsoft.com/windows2000/server/evaluation/features/adlist.asp, pp. 1-4.

"Windows 2000 Directory Services," [online], [retrieved on May 13, 2003]. Retrieved from the Internet http://www.microsoft.com/windows2000/technologies/directory/default.asp, pp. 1-2.

"Directory Integration Can Lower Total Cost of Ownership and Increase Application Functionality," [online], Jul. 27, 1998 [retrieved on May 13, 2003]. Retrieved from the Internet http://www.microsoft.com/presspass/press/1998/Jul98/ActivDPR.asp, pp. 1 of 4.

William R. Stanek, Microsoft Windows 2000 Administrator's Pocket Consultant [online]. Microsoft Corporation, 1999 [retrieved on May 8, 2003]. Retrieved from the Internet <http://www.microsoft.-com/technet/prodtechnol/ad/windows2000/evaluate/05w2kada.asp?fr...>, pp. 1-6.

"Enterprise Identity Management with Windows 2000 and Active Directory," [online], 1999 [retrieved on May 13, 2003]. Retrieved from the Internet <http://www.microsoft.com/technet/prodtechnol/ad/windows2000/evaluate/w2keims.asp?fra...>, pp. 1-16.

William R. Stanek, Microsoft Windows 2000 Administrator's Pocket Consultant [online]. Microsoft Corporation, 1999 [retrieved on May 8, 2003]. Retrieved from the Internet <http://www.microsoft.com/technet/prodtechnol/ad/windows2000/evaluate/05w2kadb.asp?fra...>, pp. 1-10.

"Integrating Applications with Windows 2000 and Active Directory," [online], Oct. 2000 [retrieved on May 8, 2003]. Retrieved from the Internet <http://www.microsoft.com/technet/-prodtechnol/ad/windows2000/avaluate/adappstr.asp?fra...>, pp. 1-12.

"Part I: Active Directory Operations," Active Directory Operations Guide, Microsoft Corporation, Microsoft Windows 2000, Version 1.5, pp. 1-187.

"Part II: Tasks and Procedures Appendices," Active Directory Operations Guide, Microsoft Corporation, Microsoft Windows 2000, Version 1.5, pp. 1-131.

"The LP Wireless Messenger", Messenger Documentation, [online]. LP Wireless, Inc., 2001 [retrieved on Nov. 2, 2002]. Retrieved from the Internet <http://www.lpwireless.com/messengerhelp.htm>, pp. 1-7.

Office Action for U.S. Appl. No. 10/633,636 mailed Oct. 11, 2006.

Office Action, U.S. Appl. No. 10/184,002, dated Jan. 9, 2007, 16 pages.

Ed Bott and Ron Person, Using Windows 95 with Internet Explorer 4.0, Feb. 17, 1998, Que, Special Edition.

America Online Inc., New AIM 4.7, Sep. 27, 2001, Internet: http://aim.aol.com.

America Online Inc., "AOL Instant Messenger", Aug. 29, 2000, Internet: www.aol.com/aim/.

CNET Networks Inc., "PopUp Killer", Sep. 13, 2001, Internet: download.cnet.com/downloads/0-10059-100-6932612.html.

WebmasterWorld.com Inc., "HTML and Browsers", Mar. 5, 2001, Internet: www.webmaster.cona/forurn21/367.htm.

"Introducing the Gordano Messaging Gordano Suite"; http://www.gordano.com; Copyright 1994-2003 Gordano.

European Search Report mailed Aug. 30, 2005 for European Application No. 03731244.

Mckendrick, Joseph; "Internet Call Centers: New Era in Customer Service"; Feb. 2002; V10, n2, pp. 22(4).

Office Action, U.S. Appl. No. 09/843,788, dated Apr. 19, 2007, 17 pages.

Office Action, U.S. Appl. No. 10/146,814, dated Jul. 2, 2007, 18 pages.

Office Action issued in U.S. Appl. No. 10/146,814 dated Dec. 11, 2006 (15 pages).

* cited by examiner

PRESENCE STATUS INDICATOR

This application claims the benefit of U.S. Provisional Application No. 60/201,738 filed on May 4, 2000, and U.S. Provisional Application No. 60/229,311 filed Sep. 1, 2000. These applications are incorporated by reference.

TECHNICAL FIELD

The present invention relates generally to transferring electronic data, and more particularly to indicating the online state of the sender and/or other addressee in an e-mail message.

BACKGROUND

Online service providers constantly are offering new services and upgrading existing services to enhance their subscribers' online experience. Subscribers have on-demand access to news, weather, financial, sports, and entertainment services as well as the ability to transmit electronic messages and to participate in online discussion groups. For example, subscribers of online service providers such as America Online or CompuServe may view and retrieve information on a wide variety of topics from servers located throughout the world. A server may be maintained by the service provider or by a third party provider who makes information and services available through the worldwide network of computers that make up the online service.

America Online has provided subscribers with the ability to send and receive instant messages. Instant messages are private online conversations between two or more people who have subscribed to the instant messaging service and have installed the necessary software. Because such online conversations take place in real time, instant messaging can provide immediate access to desired information. Instant messaging is becoming a preferred means of communicating among online subscribers.

SUMMARY

In one general aspect, electronic data is transferred between users of a communications system by delivering an e-mail message from a sender to at least one recipient and indicating the online state of the sender and any other addressees of the e-mail message upon opening of the e-mail message by the recipient.

Implementations may include one or more of the following features. For example, indicating the online state of the sender and/or other addressee may include accepting a request to check a user's online state and then indicating whether the sender and/or other addressee is online, offline, or not a member of the communications system. Determining the online state of the sender and/or other addressee may include establishing a persistent connection to an instant messaging server and/or checking a control port.

In addition, a recipient may be redirected and presented with a graphical user interface based on the online state. The graphical user interface may include an icon positioned next to an e-mail address in the e-mail message. In addition, a message may be sent to the sender and/or any other addressee according to the online state. The message may include an instant message, an e-mail message, and/or an invitation to join the communications system.

These and other general aspects may be implemented by an apparatus and/or a computer program stored on a computer readable medium. The computer readable medium may be a disc, a client device, a host device, and/or a propagated signal.

DETAILED DESCRIPTION

For illustrative purposes, FIGS. 1-6 shows an example of a communications system for implementing techniques for transferring electronic data. For brevity, several elements in the figures described below are represented as monolithic entities. However, as would be understood by one skilled in the art, these elements each may include numerous interconnected computers and components designed to perform a set of specified operations and/or may be dedicated to a particular geographical region.

Figure 1:
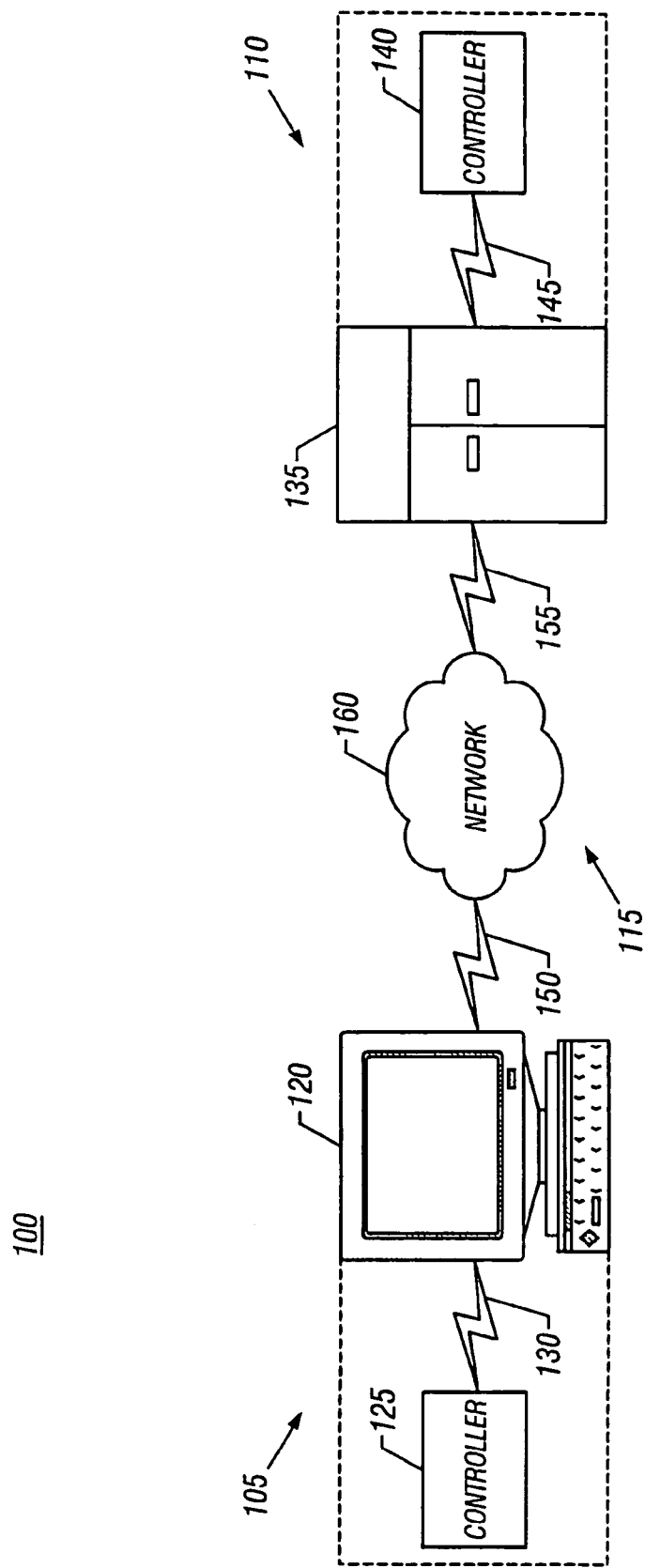
FIG. 1 is a block diagram of a communications system.

Referring to FIG. 1, a communications system 100 is capable of delivering and exchanging data between a client system 105 and a host system 110 through a communications link 115. The client system 105 typically includes one or more client devices 120 and/or client controllers 125, and the host system 110 typically includes one or more host devices 135 and/or host controllers 140. For example, the client system 105 or the host system 110 may include one or more general-purpose computers (e.g., personal computers), one or more special-purpose computers (e.g., devices specifically programmed to communicate with each other and/or the client system 105 or the host system 110), or a combination of one or more general-purpose computers and one or more special-purpose computers. The client system 105 and the host system 110 may be arranged to operate within or in concert with one or more other systems, such as, for example, one or more LANs ("Local Area Networks") and/or one or more WANs ("Wide Area Networks").

The client device 120 (or the host device 135) is generally capable of executing instructions under the command of a client controller 125 (or a host controller 140). The client device 120 (or the host device 135) is connected to the client controller 125 (or the host controller 140) by a wired or wireless data pathway 130 or 145 capable of delivering data.

The client device 120, the client controller 125, the host device 135, and the host controller 140 each typically include one or more hardware components and/or software components. An example of a client device 120 or a host device 135 is a general-purpose computer (e.g., a personal computer) capable of responding to and executing instructions in a defined manner. Other examples include a special-purpose computer, a workstation, a server, a device, a component, other physical or virtual equipment or some combination thereof capable of responding to and executing instructions. The client device 120 and the host device 135 may include devices that are capable of peer-to-peer communications.

An example of client controller 125 or a host controller 140 is a software application loaded on the client device 120 or the host device 135 for commanding and directing communications enabled by the client device 120 or the host device 135. Other examples include a program, a piece of code, an instruction, a device, a computer, a computer system, or a combination thereof, for independently or collectively instructing the client device 120 or the host device 135 to interact and operate as described. The client controller 125 and the host controller 140 may be embodied permanently or temporarily in any type of machine, component, physical or virtual equipment, storage medium, or propagated signal capable of providing instructions to the client device 120 or the host device 135.

The communications link 115 typically includes a delivery network 160 making a direct or indirect communication between the client system 105 and the host system 110, irrespective of physical separation. Examples of a delivery network 160 include the Internet, the World Wide Web, WANs, LANs, analog or digital wired and wireless telephone networks (e.g. PSTN, ISDN, and xDSL), radio, television, cable, satellite, and/or any other delivery mechanism for carrying data. The communications link 115 may include communication pathways 150, 155 that enable communications through the one or more delivery networks 160 described above. Each of the communication pathways 150, 155 may include, for example, a wired, wireless, cable or satellite communication pathway.

Figure 2:
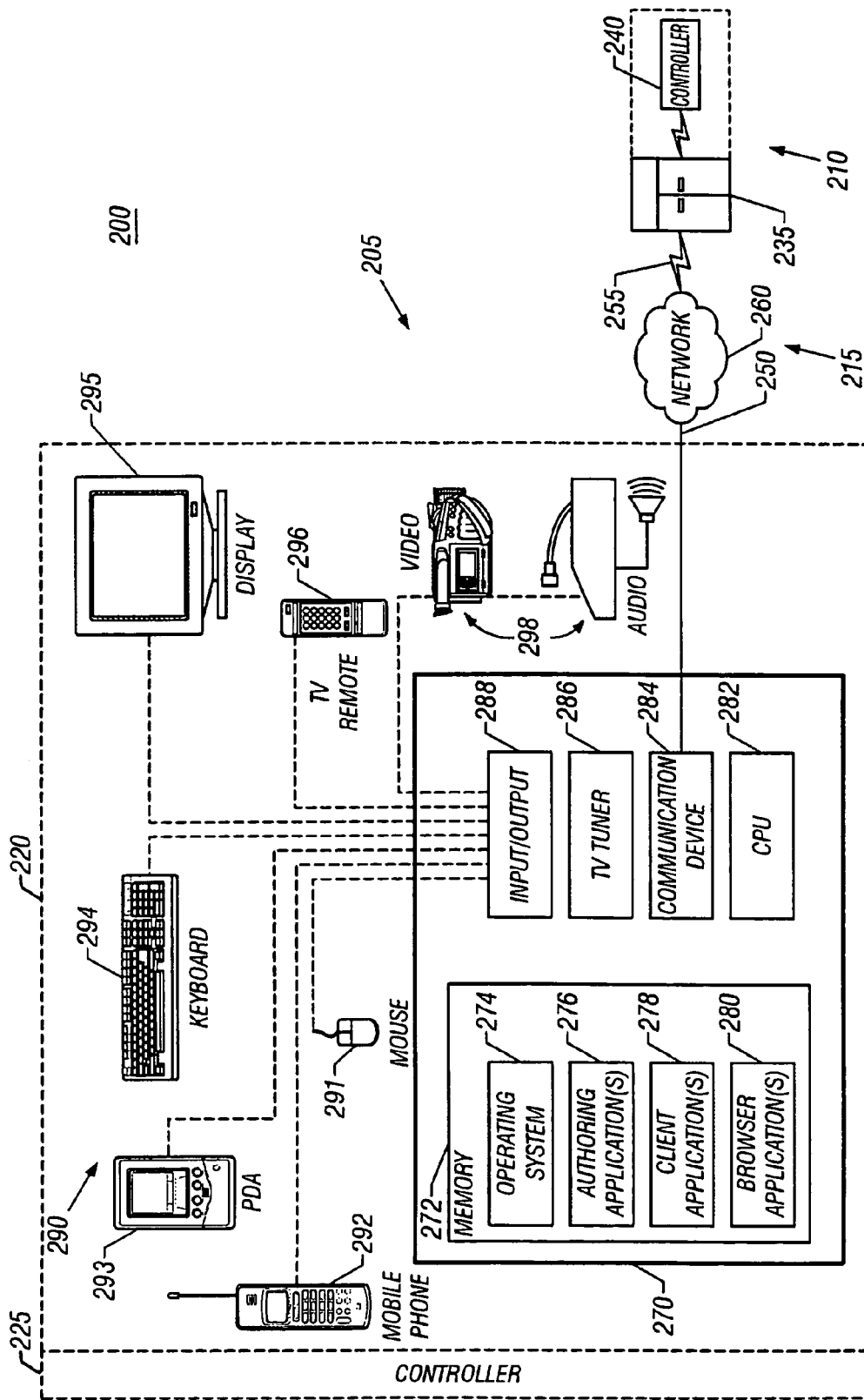
FIGS. 2-6 are block diagrams of expansions of aspects of the block diagram of FIG. 1.

FIG. 2 illustrates a communications system 200 including a client system 205 communicating with a host system 210 through a communications link 215. Client system 205 typically includes one or more client devices 220 and one or more client controllers 225 for controlling the client devices 220. Host system 210 typically includes one or more host devices 235 and one or more host controllers 240 for controlling the host devices 235. The communications link 215 may include communication pathways 250, 255 enabling communications through the one or more delivery networks 260.

Examples of each element within the communications system of FIG. 2 are broadly described above with respect to FIG. 1. In particular, the host system 210 and communications link 215 typically have attributes comparable to those described with respect to host system 110 and communications link 115 of FIG. 1. Likewise, the client system 205 of FIG. 2 typically has attributes comparable to and illustrates one possible implementation of the client system 105 of FIG. 1.

The client device 220 typically includes a general-purpose computer 270 having an internal or external storage 272 for storing data and programs such as an operating system 274 (e.g., DOS, Windows™, Windows 95™, Windows 98™, Windows 2000™, Windows Mc™, Windows XP™, Windows NT™, OS/2, or Linux) and one or more application programs. Examples of application programs include authoring applications 276 (e.g., word processing, database programs, spreadsheet programs, or graphics programs) capable of generating documents or other electronic content; client applications 278 (e.g., AOL client, CompuServe client, AIM client, AOL TV client, or ISP client) capable of communicating with other computer users, accessing various computer resources, and viewing, creating, or otherwise manipulating electronic content; and browser applications 280 (e.g., Netscape's Navigator or Microsoft's Internet Explorer) capable of rendering standard Internet content.

The general-purpose computer 270 also includes a central processing unit 282 (CPU) for executing instructions in response to commands from the client controller 225. In one implementation, the client controller 225 includes one or more of the application programs installed on the internal or external storage 272 of the general-purpose computer 270. In another implementation, the client controller 225 includes application programs externally stored in and performed by one or more device(s) external to the general-purpose computer 270.

The general-purpose computer typically will include a communication device 284 for sending and receiving data. One example of the communication device 284 is a modem. Other examples include a transceiver, a set-top box, a communication card, a satellite dish, an antenna, or another network adapter capable of transmitting and receiving data over the communications link 215 through a wired or wireless data pathway 250. The general-purpose computer 270 also may include a TV ("television") tuner 286 for receiving television programming in the form of broadcast, satellite, and/or cable TV signals. As a result, the client device 220 can selectively and/or simultaneously display network content received by communications device 284 and television programming content received by the TV tuner 286.

The general-purpose computer 270 typically will include an input/output interface 288 for wired or wireless connection to various peripheral devices 290. Examples of peripheral devices 290 include, but are not limited to, a mouse 291, a mobile phone 292, a personal digital assistant 293 (PDA), an MP3 player (not shown), a keyboard 294, a display monitor 295 with or without a touch screen input, a TV remote control 296 for receiving information from and rendering information to subscribers, and an audiovisual input device 298.

Although FIG. 2 illustrates devices such as a mobile telephone 292, a PDA 293, an MP3 player (not shown), and a TV remote control 296 as being peripheral with respect to the general-purpose computer 270, in another implementation, such devices may themselves include the functionality of the general-purpose computer 270 and operate as the client device 220. For example, the mobile phone 292 or the PDA 293 may include computing and networking capabilities and function as a client device 220 by accessing the delivery network 260 and communicating with the host system 210. Furthermore, the client system 205 may include one, some or all of the components and devices described above.

Figure 3:
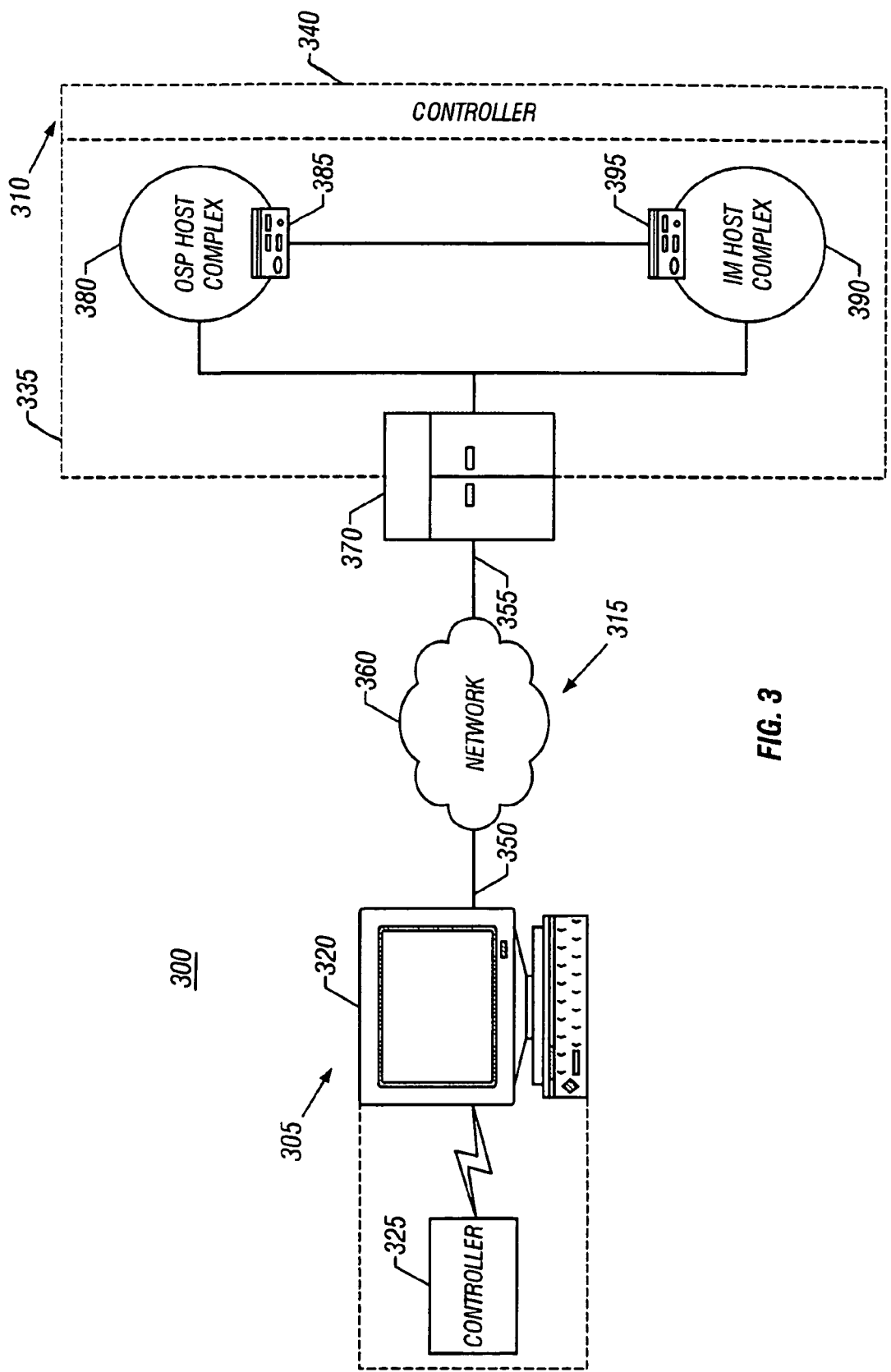

Referring to FIG. 3, a communications system 300 is capable of delivering and exchanging information between a client system 305 and a host system 310 through a communication link 315. Client system 305 typically includes one or more client devices 320 and one or more client controllers 325 for controlling the client devices 320. Host system 310 typically includes one or more host devices 335 and one or more host controllers 340 for controlling the host devices 335. The communications link 315 may include communication pathways 350, 355 enabling communications through the one or more delivery networks 360.

Examples of each element within the communications system of FIG. 3 are broadly described above with respect to FIGS. 1 and 2. In particular, the client system 305 and the communications link 315 typically have attributes comparable to those described with respect to client systems 105 and 205 and communications links 115 and 215 of FIGS. 1 and 2. Likewise, the host system 310 of FIG. 3 may have attributes comparable to and illustrates one possible implementation of the host systems 110 and 210 shown in FIGS. 1 and 2.

The host system 310 includes a host device 335 and a host controller 340. The host controller 340 is generally capable of transmitting instructions to any or all of the elements of the host device 335. For example, in one implementation, the host controller 340 includes one or more software applications loaded on the host device 335. In other implementations, as described above, the host controller 340 may include any of several other programs, machines, and devices operating independently or collectively to control the host device 335.

The host device 335 includes a login server 370 for enabling access by subscribers and for routing communications between the client system 305 and other elements of the host device 335. The host device 335 also includes various host complexes such as the depicted OSP ("Online Service Provider") host complex 380 and IM ("Instant Messaging") host complex 390. To enable access to these host complexes by subscribers, the client system 305 includes communication software, for example, an OSP client application and an IM client application. The OSP and IM communication software applications are designed to facilitate the subscriber's interactions with the respective services and, in particular, may provide access to all the services available within the respective host complexes.

Typically, the OSP host complex 380 supports different services, such as email, discussion groups, chat, news services, and Internet access. The OSP host complex 380 is generally designed with an architecture that enables the machines within the OSP host complex 380 to communicate with each other and employs certain protocols (i.e., standards, formats, conventions, rules, and structures) to transfer data. The OSP host complex 380 ordinarily employs one or more OSP protocols and custom dialing engines to enable access by selected client applications. The OSP host complex 380 may define one or more specific protocols for each service based on a common, underlying proprietary protocol.

The IM host complex 390 is generally independent of the OSP host complex 380, and supports instant messaging services irrespective of a subscriber's network or Internet access. Thus, the IM host complex 390 allows subscribers to send and receive instant messages, whether or not they have access to any particular ISP. The IM host complex 390 may support associated services, such as administrative matters, advertising, directory services, chat, and interest groups related to the instant messaging. The IM host complex 390 has an architecture that enables all of the machines within the IM host complex to communicate with each other. To transfer data, the IM host complex 390 employs one or more standard or exclusive IM protocols.

The host device 335 may include one or more gateways that connect and therefore link complexes, such as the OSP host complex gateway 385 and the IM host complex gateway 395. The OSP host complex gateway 385 and the IM host complex gateway 395 may directly or indirectly link the OSP host complex 380 with the IM host complex 390 through a wired or wireless pathway. Ordinarily, when used to facilitate a link between complexes, the OSP host complex gateway 385 and the IM host complex gateway 395 are privy to information regarding the protocol type anticipated by a destination complex, which enables any necessary protocol conversion to be performed incident to the transfer of data from one complex to another. For instance, the OSP host complex 380 and IM host complex 390 generally use different protocols such that transferring data between the complexes requires protocol conversion by or at the request of the OSP host complex gateway 385 and/or the IM host complex gateway 395.

Figure 4:
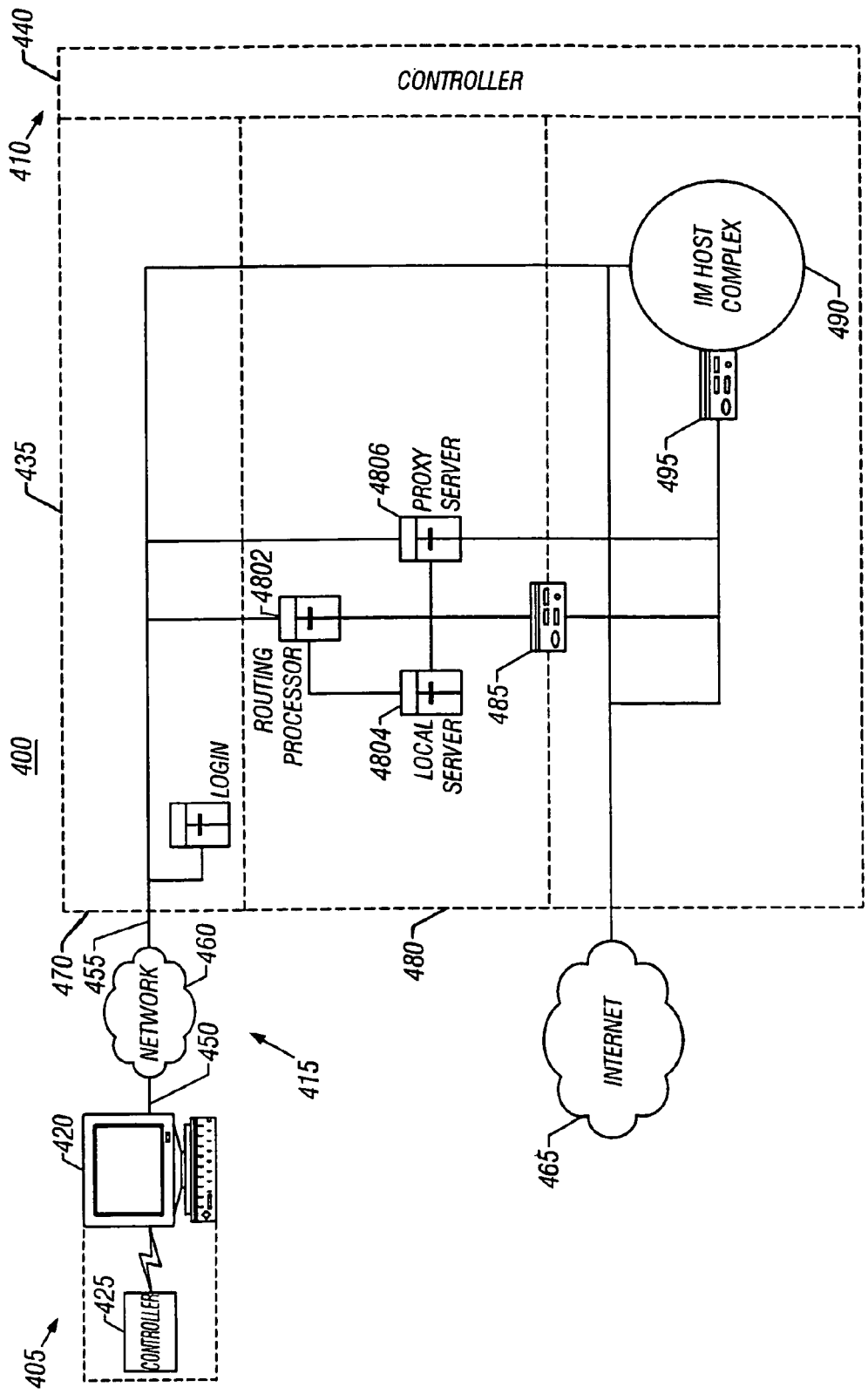

Referring to FIG. 4, a communications system 400 is capable of delivering and exchanging information between a client system 405 and a host system 410 through a communication link 415. Client system 405 typically includes one or more client devices 420 and one or more client controllers 425 for controlling the client devices 420. Host system 410 typically includes one or more host devices 435 and one or more host controllers 440 for controlling the host devices 435. The communications link 415 may include communication pathways 450, 455 enabling communications through the one or more delivery networks 460. As shown, the client system 405 may access the Internet 465 through the host system 410.

Examples of each element within the communications system of FIG. 4 are broadly described above with respect to FIGS. 1-3. In particular, the client system 405 and the communications link 415 typically have attributes comparable to those described with respect to client systems 105, 205, and 305 and communications links 115, 215, and 315 of FIGS. 1-3. Likewise, the host system 410 of FIG. 4 may have attributes comparable to and illustrates one possible implementation of the host systems 110, 210, and 310 shown in FIGS. 1-3. FIG. 4 describes an aspect of the host system 410, focusing primarily on one particular implementation of OSP host complex 480.

The client system 405 includes a client device 420 and a client controller 425. The client controller 425 is generally capable of establishing a connection to the host system 410, including the OSP host complex 480, the IM host complex 490 and/or the Internet 465. In one implementation, the client controller 425 includes an OSP application for communicating with servers in the OSP host complex 480 using exclusive OSP protocols. The client controller 425 also may include applications, such as an IM client application, and/or an Internet browser application, for communicating with the IM host complex 490 and the Internet 465.

The host system 410 includes a host device 435 and a host controller 440. The host controller 440 is generally capable of transmitting instructions to any or all of the elements of the host device 435. For example, in one implementation, the host controller 440 includes one or more software applications loaded on one or more elements of the host device 435. In other implementations, as described above, the host controller 440 may include any of several other programs, machines, and devices operating independently or collectively to control the host device 435.

The host system 410 includes a login server 470 capable of enabling communications with and authorizing access by client systems 405 to various elements of the host system 410, including an OSP host complex 480 and an IM host complex 490. The login server 470 may implement one or more authorization procedures to enable simultaneous access to the OSP host complex 480 and the IM host complex 490. The OSP host complex 480 and the IM host complex 490 are connected through one or more OSP host complex gateways 485 and one or more IM host complex gateways 495. Each OSP host complex gateway 485 and IM host complex gateway 495 may perform any protocol conversions necessary to enable communications between the OSP host complex 480, the IM host complex 490, and the Internet 465.

The OSP host complex 480 supports a set of services from one or more servers located internal to and external from the OSP host complex 480. Servers external to the OSP host complex 480 generally may be viewed as existing on the Internet 465. Servers internal to the OSP complex 480 may be arranged in one or more configurations. For example, servers may be arranged in centralized or localized clusters in order to distribute servers and subscribers within the OSP host complex 480.

In one implementation of FIG. 4, the OSP host complex 480 includes a routing processor 4802. In general, the routing processor 4802 will examine an address field of a data request, use a mapping table to determine the appropriate destination for the data request, and direct the data request to the appropriate destination. In a packet-based implementation, the client system 405 may generate information requests, convert the requests into data packets, sequence the data packets, perform error checking and other packet-switching techniques, and transmit the data packets to the routing processor 4802. Upon receiving data packets from the client system 405, the routing processor 4802 may directly or indirectly route the data packets to a specified destination within or outside of the OSP host complex 480. For example, in the event that a data request from the client system 405 can be satisfied locally, the routing processor 4802 may direct the data request to a local server 4804. In the event that the data request cannot be satisfied locally, the routing processor 4802 may direct the data request externally to the Internet 465 or the IM host complex 490 through the gateway 485.

The OSP host complex 480 also includes a proxy server 4806 for directing data requests and/or otherwise facilitating communication between the client system 405 and the Internet 465. The proxy server 4806 may include an IP ("Internet Protocol") tunnel for converting data from OSP protocol into standard Internet protocol and transmitting the data to the Internet 465. The IP tunnel also converts data received from the Internet 465 in the standard Internet protocol back into the OSP protocol and sends the converted data to the routing processor 4802 for delivery back to the client system 405.

The proxy server 4806 also may allow the client system 405 to use standard Internet protocols and formatting to access the OSP host complex 480 and the Internet 465. For example, the subscriber may use an OSP TV client application having an embedded browser application installed on the client system 405 to generate a request in standard Internet protocol, such as HTTP ("HyperText Transport Protocol"). In a packet-based implementation, data packets may be encapsulated inside a standard Internet tunneling protocol, such as, for example, UDP ("User Datagram Protocol") and routed to the proxy server 4806. The proxy server 4806 may include an L2TP ("Layer Two Tunneling Protocol") tunnel capable of establishing a point-to-point protocol (PPP) session with the client system 405.

The proxy server 4806 also may act as a buffer between the client system 405 and the Internet 465, and may implement content filtering and time saving techniques. For example, the proxy server 4806 can check parental controls settings of the client system 405 and request and transmit content from the Internet 465 according to the parental control settings. In addition, the proxy server 4806 may include one or more caches for storing frequently accessed information. If requested data is determined to be stored in the caches, the proxy server 4806 may send the information to the client system 405 from the caches and avoid the need to access the Internet 465.

Figure 5:
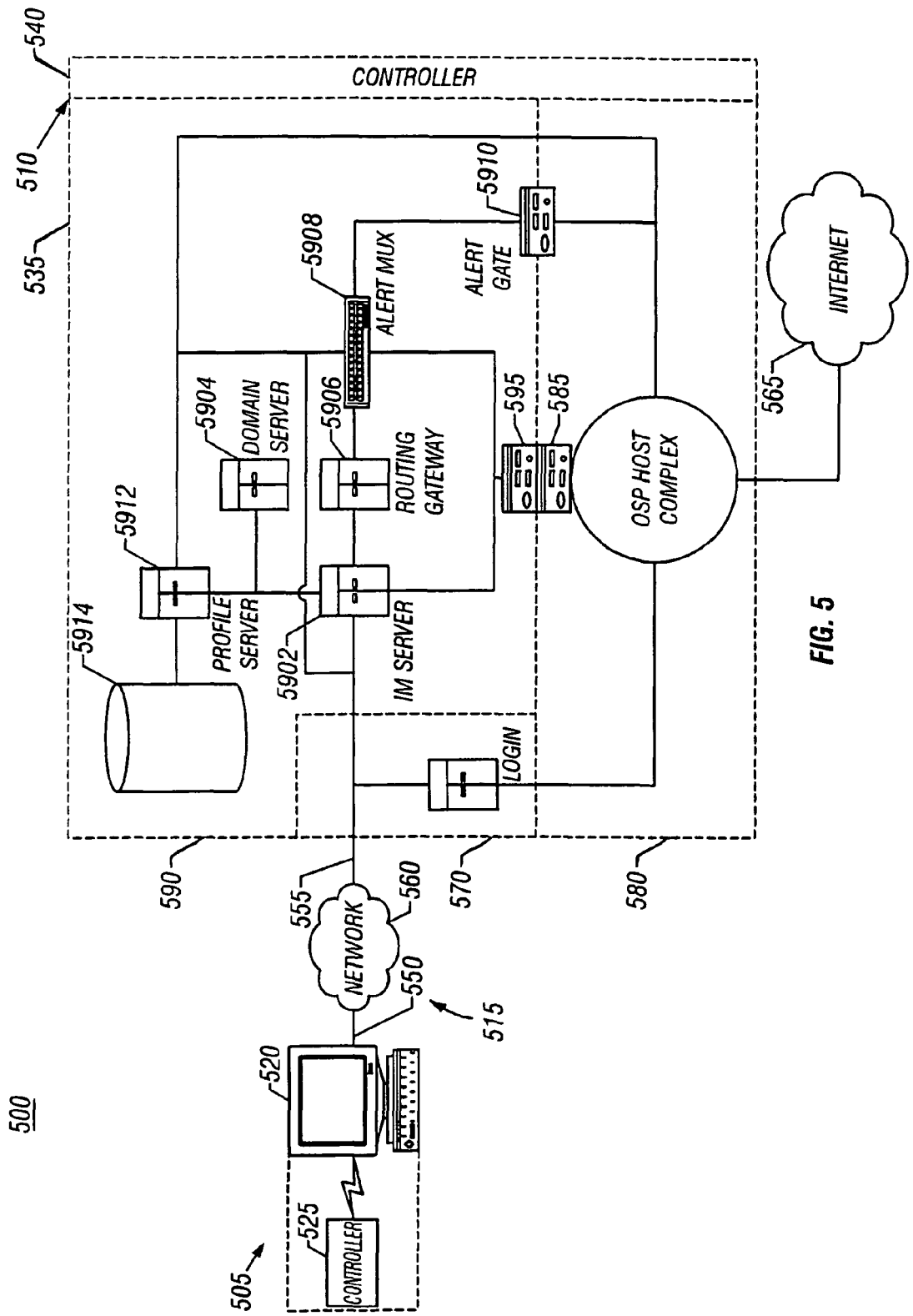

Referring to FIG. 5, a communications system 500 is capable of delivering and exchanging information between a client system 505 and a host system 510 through a communication link 515. Client system 505 typically includes one or more client devices 520 and one or more client controllers 525 for controlling the client devices 520. Host system 510 typically includes one or more host devices 535 and one or more host controllers 540 for controlling the host devices 535. The communications link 515 may include communication pathways 550, 555 enabling communications through the one or more delivery networks 560. As shown, the client system 505 may access the Internet 565 through the host system 510.

Examples of each element within the communications system of FIG. 5 are broadly described above with respect to FIGS. 1-4. In particular, the client system 505 and the communications link 515 typically have attributes comparable to those described with respect to client systems 105, 205, 305, and 405 and communications links 115, 215, 315, and 415 of FIGS. 1-4. Likewise, the host system 510 of FIG. 5 may have attributes comparable to and illustrates one possible implementation of the host systems 110, 210, 310, and 410 shown in FIGS. 1-4. FIG. 5 describes an aspect of the host system 510, focusing primarily on one particular implementation of IM host complex 590.

The client system 505 includes a client device 520 and a client controller 525. The client controller 525 is generally capable of establishing a connection to the host system 510, including the OSP host complex 580, the IM host complex 590 and/or the Internet 565. In one implementation, the client controller 525 includes an IM application for communicating with servers in the IM host complex 590 utilizing exclusive IM protocols. The client controller 525 also may include applications, such as an OSP client application, and/or an Internet browser application for communicating with the OSP host complex 580 and the Internet 565, respectively.

The host system 510 includes a host device 535 and a host controller 540. The host controller 540 is generally capable of transmitting instructions to any or all of the elements of the host device 535. For example, in one implementation, the host controller 540 includes one or more software applications loaded on one or more elements of the host device 535. However, in other implementations, as described above, the host controller 540 may include any of several other programs, machines, and devices operating independently or collectively to control the host device 535.

The host system 510 includes a login server 570 capable of enabling communications with and authorizing access by client systems 505 to various elements of the host system 510, including an OSP host complex 580 and an IM host complex 590. The login server 570 may implement one or more authorization procedures to enable simultaneous access to the OSP host complex 580 and the IM host complex 590. The OSP host complex 580 and the IM host complex 590 are connected through one or more OSP host complex gateways 585 and one or more IM host complex gateways 595. Each OSP host complex gateway 585 and IM host complex gateway 595 may perform any protocol conversions necessary to enable communication between the OSP host complex 580, the IM host complex 590, and the Internet 565.

To access the IM host complex 590 to begin an instant messaging session, the client system 505 establishes a connection to the login server 570. The login server 570 typically determines whether the particular subscriber is authorized to access the IM host complex 590 by verifying a subscriber identification and password. If the subscriber is authorized to access the IM host complex 590, the login server 570 employs a hashing technique on the subscriber's screen name to identify a particular IM server 5902 for use during the subscriber's session. The login server 570 provides the client system 505 with the IP address of the particular IM server 5902, gives the client system 505 an encrypted key (i.e., a cookie), and breaks the connection. The client system 505 then uses the IP address to establish a connection to the particular IM server 5902 through the communications link 515, and obtains access to that IM server 5902 using the encrypted key. Typically, the client system 505 will be equipped with a Winsock API ("Application Programming Interface") that enables the client system 505 to establish an open TCP connection to the IM server 5902.

Once a connection to the IM server 5902 has been established, the client system 505 may directly or indirectly transmit data to and access content from the IM server 5902 and one or more associated domain servers 5904. The IM server 5902 supports the fundamental instant messaging services and the domain servers 5904 may support associated services, such as, for example, administrative matters, directory services, chat and interest groups. In general, the purpose of the domain servers 5904 is to lighten the load placed on the IM server 5902 by assuming responsibility for some of the services within the IM host complex 590. By accessing the IM server 5902 and/or the domain server 5904, a subscriber can use the IM client application to view whether particular subscribers ("buddies") are online, exchange instant messages with particular subscribers, participate in group chat rooms, trade files such as pictures, invitations or documents, find other subscribers with similar interests, get customized news and stock quotes, and search the World Wide Web.

In the implementation of FIG. 5, the IM server 5902 is directly or indirectly connected to a routing gateway 5906. The routing gateway 5906 facilitates the connection between the IM server 5902 and one or more alert multiplexors 5908, for example, by serving as a link minimization tool or hub to connect several IM servers 5902 to several alert multiplexors 5908. In general, an alert multiplexor 5908 maintains a record of alerts and subscribers registered to receive the alerts.

Once the client system 505 is connected to the alert multiplexor 5908, a subscriber can register for and/or receive one or more types of alerts. The connection pathway between the client system 505 and the alert multiplexor 5908 is determined by employing another hashing technique at the IM server 5902 to identify the particular alert multiplexor 5908 to be used for the subscriber's session. Once the particular multiplexor 5908 has been identified, the IM server 5902 provides the client system 505 with the IP address of the particular alert multiplexor 5908 and gives the client system 505 an encrypted key (i.e., a cookie). The client system 505 then uses the IP address to connect to the particular alert multiplexor 5908 through the communication link 515 and obtains access to the alert multiplexor 5908 using the encrypted key.

The alert multiplexor 5908 is connected to an alert gate 5910 that, like the IM host complex gateway 595, is capable of performing the necessary protocol conversions to form a bridge to the OSP host complex 580. The alert gate 5910 is the interface between the IM host complex 590 and the physical servers, such as servers in the OSP host complex 580, where state changes are occurring. In general, the information regarding state changes will be gathered and used by the IM host complex 590. However, the alert multiplexor 5908 also may communicate with the OSP host complex 580 through the IM host complex gateway 595, for example, to provide the servers and subscribers of the OSP host complex 580 with certain information gathered from the alert gate 5910.

The alert gate 5910 can detect an alert feed corresponding to a particular type of alert. The alert gate 5910 may include a piece of code (alert receive code) capable of interacting with another piece of code (alert broadcast code) on the physical server where a state change occurs. In general, the alert receive code installed on the alert gate 5910 instructs the alert broadcast code installed on the physical server to send an alert feed to the alert gate 5910 upon the occurrence of a particular state change. Upon detecting an alert feed, the alert gate 5910 contacts the alert multiplexor 5908, which in turn, informs the client system 505 of the detected alert feed.

In the implementation of FIG. 5, the IM host complex 590 also includes a subscriber profile server 5912 connected to a database 5914 for storing large amounts of subscriber profile data. The subscriber profile server 5912 may be used to enter, retrieve, edit, manipulate, or otherwise process subscriber profile data. In one implementation, a subscriber's profile data includes, for example, the subscriber's buddy list, alert preferences, designated stocks, identified interests, and geographic location. The subscriber may enter, edit and/or delete profile data using an installed IM client application on the client system 505 to interact with the subscriber profile server 5912.

Because the subscriber's data is stored in the IM host complex 590, the subscriber does not have to reenter or update such information in the event that the subscriber accesses the IM host complex 590 using a new or a different client system 505. Accordingly, when a subscriber accesses the IM host complex 590, the IM server 5902 can instruct the subscriber profile server 5912 to retrieve the subscriber's profile data from the database 5914 and to provide, for example, the subscriber's buddy list to the IM server 5902 and the subscriber's alert preferences to the alert multiplexor 5908. The subscriber profile server 5912 also may communicate with other servers in the OSP host complex 580 to share subscriber profile data with other services. Alternatively, user profile data may be saved locally on the client device 505.

Figure 6:
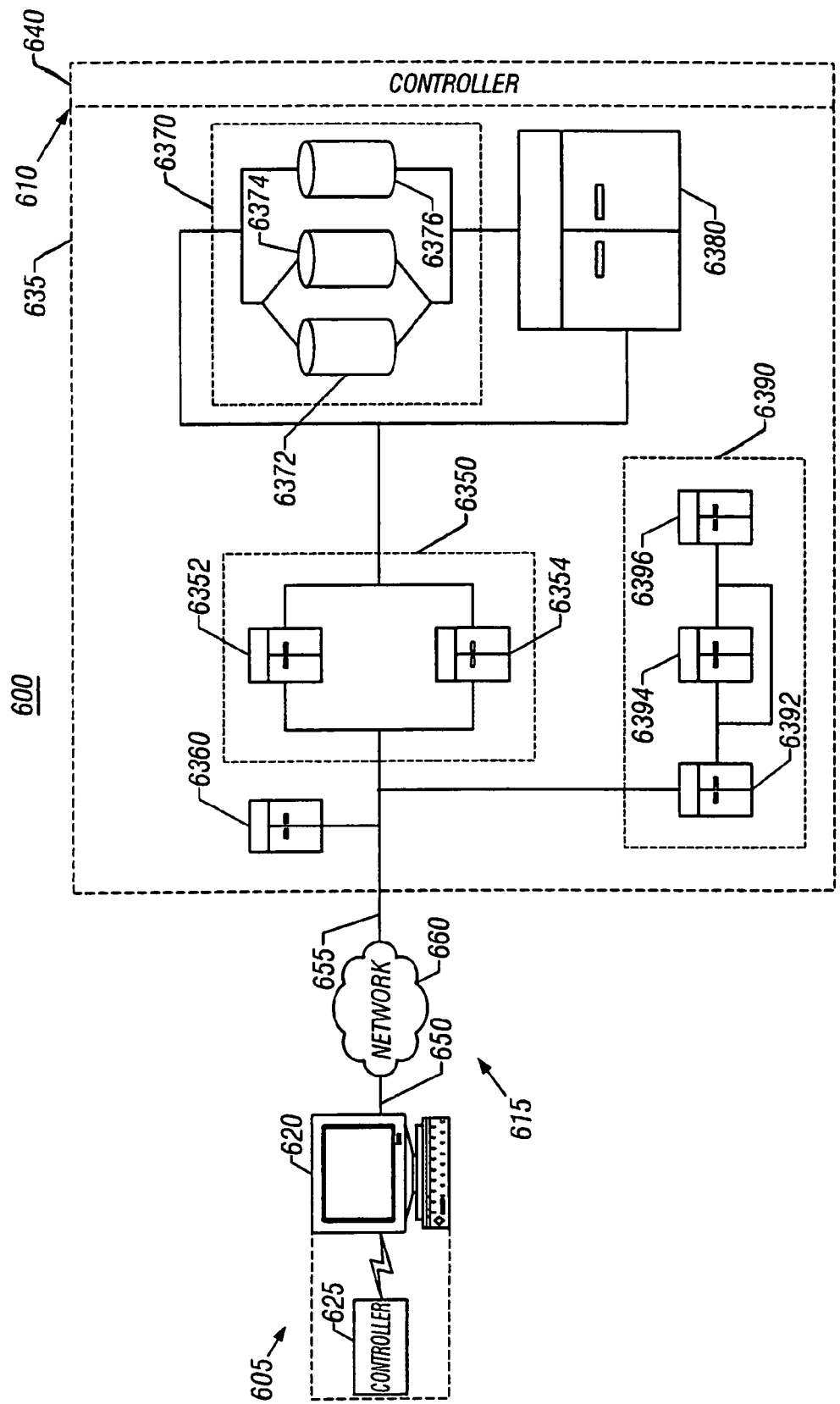

Referring to FIG. 6, a communications system 600 is capable of delivering and exchanging information between a client system 605 and a host system 610 through a communication link 615. Client system 605 typically includes one or more client devices 620 and one or more client controllers 625 for controlling the client devices 620. Host system 610 typically includes one or more host devices 635 and one or more host controllers 640 for controlling the host devices 635. The communication link may include communication pathways 650, 655 enabling communications through the one or more delivery networks 660. The network 660 may be any known or described delivery network including, but not limited, to a telephone network and/or the Internet.

Examples of each element within the communication system of FIG. 6 are broadly described above with respect to FIGS. 1-5. In particular, the client system 605 and the communications link 615 typically have attributes comparable to those described with respect to client systems 105, 205, 305, 405, and 505 and communications links 115, 215, 315, 415, and 515 of FIGS. 1-5. Likewise, the host system 610 of FIG. 6 may have attributes comparable to and illustrates one possible embodiment of the host systems 110, 210, 310, 410, and 510 shown in FIGS. 1-5, respectively. However, FIG. 6 describes an aspect of the host system 610, focusing primarily on one particular implementation of the host device 635.

The client system 605 includes a client device 620 and a client controller 625. The client controller 625 is generally capable of establishing a connection to the host system 610 through the delivery network 615. In one implementation, the client controller 625 includes one or more applications, such as an IM application, an OSP application, and/or an Internet browser application.

The host system 610 includes a host device 635 and a host controller 640. The host controller 640 is generally capable of transmitting instructions to any or all of the elements of the host device 635. For example, in one implementation, the host controller 640 includes one or more software applications loaded on one or more elements of the host device 635. However, in other implementations, as described above, the host controller 640 may include any of several other programs, machines, and devices operating independently or collectively to control the host device 635.

The host device 635 includes a mail gateway 6350 having a send mail server 6352 and a read mail server 6354. The send mail server 6352 is configured to perform functions relating to transmitting electronic data. The read mail server 6354 is configured to perform functions relating to receiving and accessing electronic data. The mail gateway 6350 is in communication with one or more processing servers 6360.

The mail gateway 6350 also is in communication with the storage area 6370 and a tandem database 6380. The storage area 6370 includes electronic content databases 6372, 6374 and attachment database 6376. The tandem database 6380 includes a system of folders that store electronic data for subscribers of the host system 610.

The host device 635 includes an IM host complex 6390. The IM server 6390 typically has attributes comparable to some or all elements of IM host complexes 390, 490, 590, and 690. The IM host complex 6390 includes an e-buddy server 6392 in communication with the client system 605, the read mail server 6352, a look-up server 6394, and an IM server 6396. The IM server 6396 is capable of supporting instant messaging services, the look-up server 6394 is capable of finding subscriber account information (e.g., screen name) from a given e-mail address, and the e-buddy server is 6392 is capable of configuring IM communication between the intended recipient of an e-mail message and the sender and/or other recipients of the e-mail message.

Figure 7:
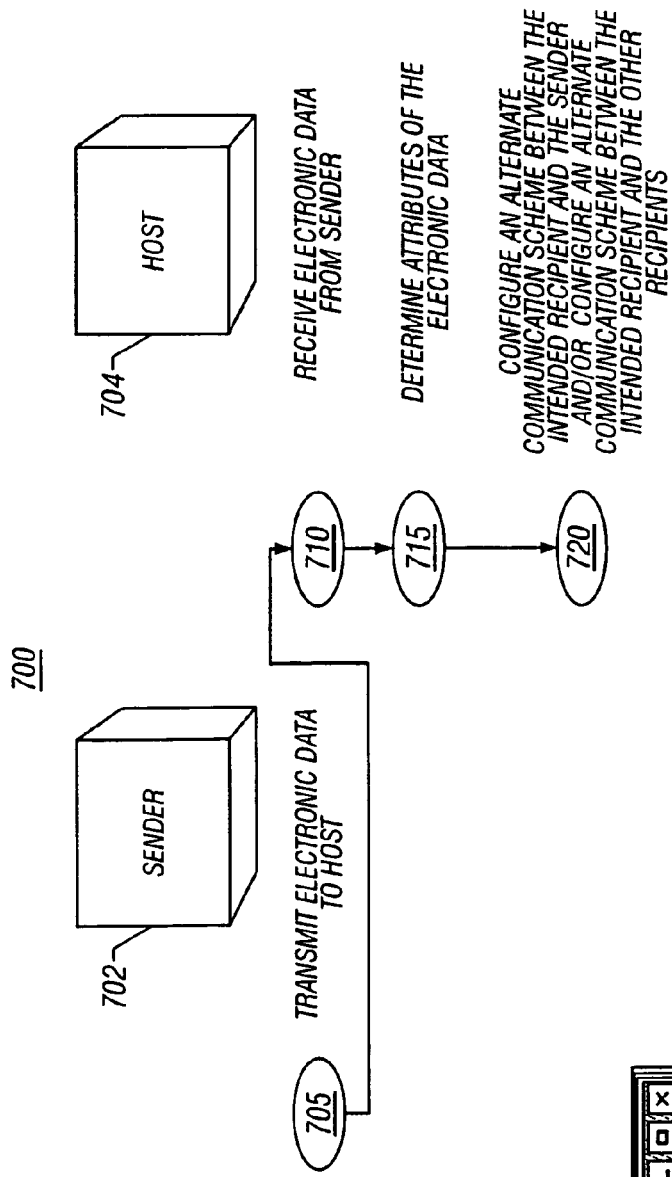
FIGS. 7 and 8 are flow charts of communications methods that may be implemented by the systems of FIGS. 1-6.

Referring to FIG. 7, a sender 702 and a host 704 interact according to a procedure 700 to transmit electronic data. The procedure 700 may be implemented by any type of hardware, software, device, computer, computer system, equipment, component, program, application, code, storage medium, or propagated signal.

Examples of each element of FIG. 7 are broadly described above with respect to FIGS. 1-6. In particular, the sender 702 typically has attributes comparable to those described with respect to client devices 120, 220, 320, 420, 520, and 620 and/or client controllers 125, 225, 325, 425, 525, and 625. The host 704 typically has attributes comparable to those described above with respect to host devices 135, 235, 335, 435, 535, and 635 and/or host controllers 140, 240, 340, 440, 540, and 640. The sender 702 and/or the host 704 may be directly or indirectly interconnected through a known or described delivery network.

Initially, the sender 702 transmits electronic data to the host 704 (step 705). In one implementation, the sender 702 is a client system 605 associated with an end user of the communication system 600. In another implementation, the sender 702 aids the client system 605 in transmitting electronic data through a communications link 615 to the host system 610. In yet another implementation, the sender 702 is a processing server 6360 within the host system 610. For example, the processing server 6360 may be a web mail server arranged to store and forward electronic data transmitted between end users of the communication system 600.

The host 704 receives the electronic data from the sender 702 (step 710). In one implementation, the mail gateway 6350 receives the electronic data from the client system 605 and/or the processing server 6360. Typically, the mail gateway 6350 will receive electronic content from subscribers through a dial-up telephone network or DSL (digital subscriber line) and will receive electronic content from non-subscribers indirectly through the Internet. The mail gateway 6350 may perform protocol conversions if necessary to receive electronic content from non-subscribers.

After receiving the electronic data from the sender 702 (step 710), the host 704 determines one or more attributes of the electronic data (step 715). Attributes of the electronic data may include, but are not limited to, an identification token, the author of the electronic data, the recipient(s) of the electronic data, the subject of the electronic data, the date and time of the transmission, and/or whether the electronic data contains attachments or embedded images. The host 704 typically will store the contents and attributes of the electronic data. For example, in one implementation, contents of the electronic data are stored in the storage area 6370 and the attributes of the electronic data are cached locally in the e-buddy server 6392 and also stored in the tandem database 6380. The body of the electronic data is stored in electronic content databases 6372, 6374 and any attachments are stored in the attachment database 6376. In this example, the body of the electronic data is stored twice to assure its availability. Due to the typically large sizes of attachments, however, such objects are only stored once to conserve memory space.

The tandem database 6380 includes a system of folders corresponding to the subscribers of the host system 610. Each folder may have properties assigned by the subscriber including, for example, properties for filtering electronic content from certain sources. When electronic data are received, the folder stores the attributes of the electronic data including the location(s) of the electronic data content (i.e., body and attachments) in the storage area 6370.

The host 704 then configures an alternate communication scheme between the intended recipient and the sender 702 and/or configures an alternate communication scheme between the intended recipient and other recipients based on the detected attributes of the electronic data (step 720).

Figure 8:
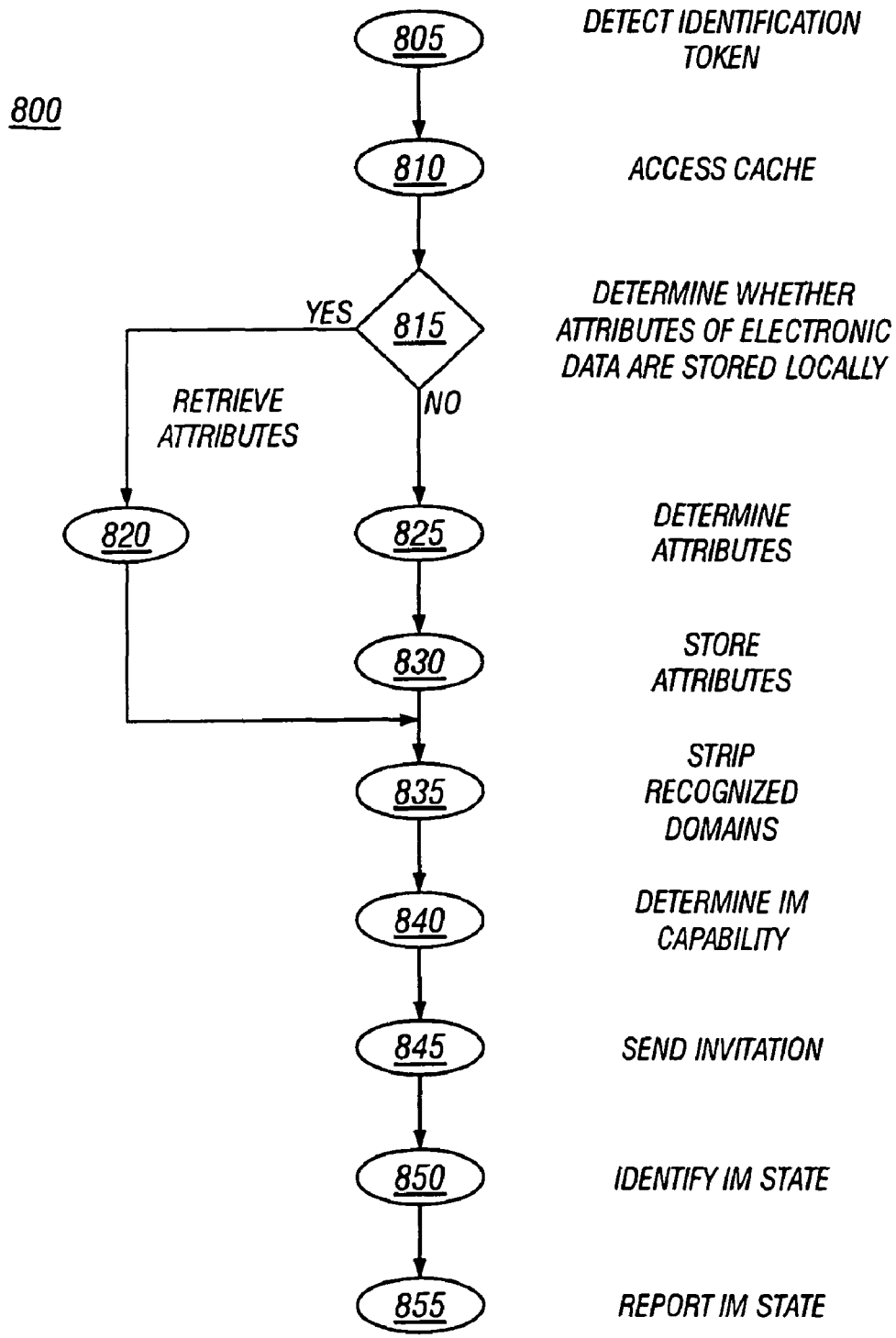

FIG. 8 illustrates one implementation of a procedure 800 for configuring an alternate communications scheme. Initially, the e-buddy server 6392 detects an identification token associated with incoming electronic data (e.g., an e-mail message) (step 805). The identification token may be intercepted by the e-buddy server 6392 and/or presented to the e-buddy server 6392 by the client system 605, the processing server 6360, and/or the read mail server 6352. By referencing the token, the e-buddy server 6392 accesses a cache (step 810) and determines whether attributes of the electronic data are stored locally (step 815). Such attributes may include, but are not limited to, a listing of the sender and all recipients associated with the electronic data.

If attributes of the electronic data are stored locally, the e-buddy server 6392 retrieves the attributes from the local cache (step 820). If, on the other hand, attributes of the electronic data are not stored locally, the e-buddy server 6392 determines the attributes of the electronic data (step 825) and then stores the attributes in a local cache (step 830). The e-buddy server 6392 may determine the attributes of the electronic data itself and/or may access another server to determine the attributes. In one implementation, the e-buddy server 6392 accesses the read mail server 6354. The read mail server 6354 then determines attributes of the electronic data, including a listing of the sender and the recipients associated with the electronic data, and presents the attributes to the e-buddy server 6392. The e-buddy server 6392 receives the listing from the read mail server 6354 and stores the listing in a local cache.

The sender and the recipients listed may or may not be subscribers of the communication system 600. In one implementation, the listing includes e-mail addresses of subscribers and non-subscribers. The e-buddy server 6392 strips the domain (e.g., @aol.com) from the e-mail address of a subscriber with a recognized domain to obtain the subscriber's screen name (step 835). This step facilitates the reverse look-up process.

The e-buddy server 6392 sends the listing of e-mail addresses to the look-up server 6394. The look-up server determines the instant messaging capability of each of the e-mail addresses and/or screen names (step 840). In one implementation, the look-up server 6394 determines whether each e-mail address is associated with a subscriber of the communication system 600 and/or the IM host complex 6390. In another implementation, the look-up server 6394 checks to see whether a screen name is associated with an active account having IM capability.

The look-up server 6394 reports back to the e-buddy server 6392 and identifies to the e-buddy server 6392 which of the sender and the recipients have the capability to communicate using instant messaging.

Based on this information, the e-buddy server 6392 interacts with the IM server 6396. In one implementation, the e-buddy server 6392 instructs the IM server 6396 to send an invitation to those without instant messaging capability (step 845). The invitation may invite the sender and/or recipient to subscribe to the IM host complex 6390 and/or the host system 610. For those with instant messaging capability, the e-buddy server 6392 requests the IM server 6396 to identify the IM state of the particular user (e.g., online, offline, away, busy). As described above, the IM server 6396 may be a network of interconnected servers capable of determining the state or online presence of subscribers. The online presence of a particular subscriber can be detected, for example, from a persistent connection to an IM server and/or the activity of a specific control port.

In response to the request(s) from e-buddy server 6392, the IM server 6396 identifies the IM state of each of the sender and the recipients (e.g., online, offline, not a member) (step 850). In one implementation the IM state is given by whether each of the sender and recipients is online, offline, or does not have instant messaging capability. The IM server 6396 and/or the e-buddy server 6392 reports the IM state of each of the sender and recipients to the intended recipient (step 855). In one implementation, a particular graphical user interface is displayed to the recipient based on the IM state. For example, upon opening an e-mail message, the recipient may receive one or more redirection commands based on the IM state of the sender and any other addressees of the e-mail message. The redirection command may include a URL for navigating the recipient's browser to a particular URL associated with a graphical user interface and/or icon corresponding to one of the IM states.

In an HTML-based environment, the redirection command may include source code such as, for example:
<A HREF="emailaction.tmpl?from=user@domain.com&email=user@domain.com&name=&givenname=&sn="><IMGSRC="http://imserver.imhostcomplex.osp.com:80/user@domain.com?on_url=http://tristate.team.com/webmail/br/nc/images/online.gif&off_url=http://tristate .team.com/webmail/br/nc/images/offline.gif&noexist_url=http://tristate.team.com/webmail/br/nc/images/noexists.gif" WIDTH=16 HEIGHT=16 BORDER=0></A>
<AHREF="emailaction.tmpl?from=user domain.com&email=user@domain.com&name=& givenname=&sn="">user@domain.com</A>

When the source code is rendered by a browser application, a state image is shown even if the user is off-line or not a member of the communications system. Each state is associated with a different image. In this example, a fixed height and width attribute is placed in the [Unable to display image] tag, which allows the web page to render before the images have been resolved.

Figure 9:
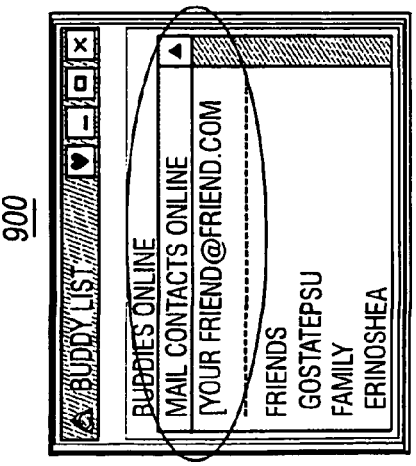
FIGS. 9 and 10 are illustrations of different graphical user interfaces that may be provided by the system of FIGS. 1-6.

Referring to FIG. 9, a UI 900 illustrates an example of how the IM state of each of the sender and/or other addressees is displayed to a recipient. The UI 900 includes an instant messaging "buddy list" 905. In general, a subscriber's buddy list is a user interface that lists the online status and capabilities of certain screen names, i.e., "buddies," identified by the subscriber. In particular, the buddy list interfaces with the host to identify which buddies are online, i.e., currently accessing the host. The buddy list also facilitates instant messaging communication between subscribers. A subscriber can activate an instant messaging message window pre-addressed to a buddy simply by clicking the screen name of a buddy on the buddy list. Otherwise, the subscriber must activate and address a blank instant messaging window. When necessary, a subscriber can look up the screen name of an intended recipient using the intended recipient's e-mail address or other identifying information.

In one implementation, if a person associated with an e-mail address and/or screen name in an e-mail message can receive an instant message, the person's e-mail address and/or screen name will appear in a group called Mail Contacts 910. If the person is online, a user (e.g., recipient) can send an instant message to the person by clicking the person's screen name and/or e-mail address. If the person does not have instant messaging capability, the e-mail address will appear in brackets, e.g., [yourfriend@friend.com]. A user may send an e-mail message to the person by clicking the bracketed e-mail address. The e-mail message may include, for example, an invitation and/or instructions for obtaining instant messaging capability. Sending invitations to prospective subscribers will increase the popularity of instant messaging.

Figure 10:
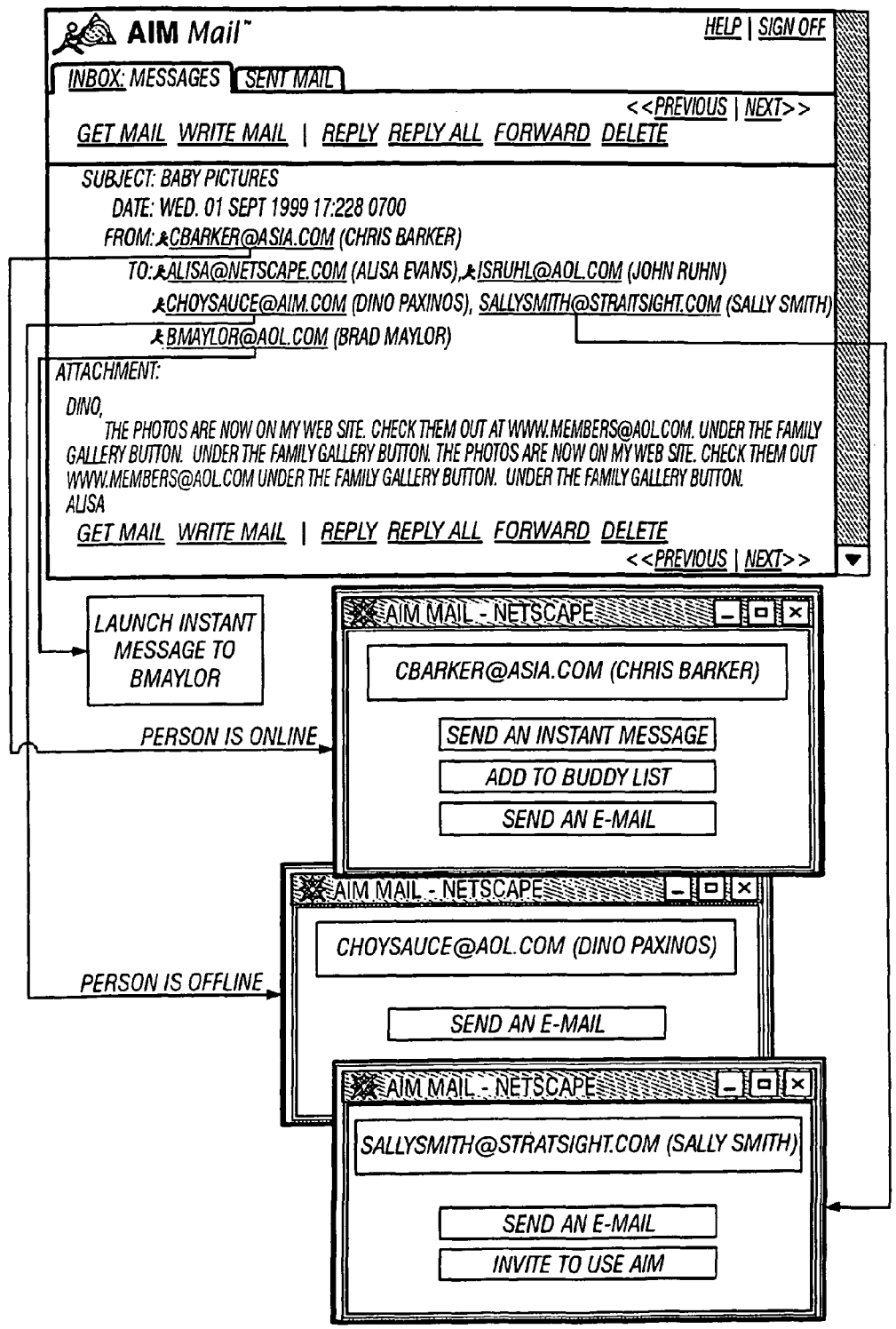

FIG. 10 illustrates another example of how the IM state of each of the sender and the recipients may be represented. An icon next to a person's address in an e-mail message may indicate to the recipient that that the person has IM capability. By clicking on the person's address, the recipient may launch an instant message. Where an icon does not appear next to a person's address, the person does not presently have IM capability. By clicking on the person's address, the recipient may send an e-mail message to the person. If the person is not a member of any IM service, the recipient can send the person an invitation.

The general aspects described above relate to instant messaging and e-mail as well as other forms of communication such as, for example, telephonic communication (e.g., mobile phones, pagers). Other implementations are within the scope of the following claims.

What is claimed is:

1. A communications method for transferring electronic data between users of a communications system, the method comprising:
    delivering an e-mail message from a sender to at least one recipient; and
    upon opening of the e-mail message by the recipient, indicating on a display, to the at least one recipient, an online state of one or more of the sender and any one other recipient of the e-mail message,
    wherein indicating the online state comprises:
    determining an identity of one or more of the sender or any one other recipient by stripping a domain name from an email address associated with the one or more of the sender or any one other recipient, and
    determining the online state of the one or more of the sender or any one other recipient by performing a reverse look-up with the determined identity of the one or more of the sender or any one other recipient.

2. The method of claim 1 further comprising sending a message to at least one of the sender and any other recipient based on the online state.

3. The method of claim 2 wherein the message comprises an instant message.

4. The method of claim 2 wherein the message comprises an e-mail message.

5. The method of claim 4 wherein the e-mail message comprises an invitation to join the communications system.

6. The method of claim 1 wherein indicating the online state comprises displaying a graphical user interface to the recipient.

7. The method of claim 6 wherein the graphical user interface comprises an icon positioned next to an e-mail address in the e-mail message.

8. The method of claim 1 wherein indicating the online state comprises indicating whether the sender is online, offline, or not a member of the communications system.

9. The method of claim 1 wherein indicating the online state comprises accepting a request to check user online state.

10. The method of claim 9 wherein the request comprises at least one e-mail address.

11. The method of claim 9 wherein the request comprises an Internet protocol.

12. The method of claim 11 wherein the Internet protocol is hypertext transfer protocol.

13. The method of claim 9 wherein the request is initiated by a client of the user.

14. The method of claim 9 further comprising sending a redirection command based on the online state.

15. The method of claim 14 wherein the redirection command comprises a uniform resource locator.

16. The method of claim 1 wherein indicating the online state comprises establishing a persistent connection to an instant messaging server.

17. The method of claim 1 wherein indicating the online state comprises checking a control port.

18. The method of claim 1 further comprising enabling a graphical user interface based upon the online state.

19. The method of claim 18 wherein a graphical user interface enabled for a first online state differs from a graphical user interface enabled for a second online state.

20. The method of claim 1 wherein indicating the online state comprises indicating the online state of the sender of the e-mail message.

21. The method of claim 1 wherein indicating the online state comprises indicating the online state of at least one other recipient of the e-mail message.

22. The method of claim 1 wherein indicating the online state comprises indicating the online state of both the sender and at least one other recipient of the e-mail message.

23. The method of claim 1 wherein indicating the online state comprises indicating the online state of the sender and every other recipient of the e-mail message.

24. The method of claim 1 wherein indicating the online state comprises indicating whether one or more of the sender and any other recipient is online, offline, away, busy, or not a member of the communications system.

25. The method of claim 1 wherein indicating the online state comprises providing one or more visual indicators to the recipient.

26. The method of claim 25 wherein the visual indicators are associated with one or more of the sender and at least one other recipient.

27. The method of claim 25 wherein characteristics of the visual indicators are used to indicate the online state of one or more of the sender and at least one other recipient.

28. The method of claim 25 further comprising selecting at least one of the visual indicators to initiate at least one user interface.

29. The method of claim 28 wherein selecting the at least one visual indicator initiates at least one user interface configured to enable the recipient to send an e-mail message communication to an identity associated with the visual indicator.

30. The method of claim 28 wherein selecting the at least one visual indicator initiates at least one user interface configured to enable the recipient to send an instant message communication to an identity associated with the visual indicator.

31. A computer program for transferring electronic data between users of a communications system, the computer program being stored on a non-transitory computer readable medium and comprising instructions for:
   delivering an e-mail message from a sender to at least one recipient;
   upon opening of the e-mail message by the recipient, indicating on a display, to the at least one recipient, an online state of at least one of the sender and any one other recipient of the e-mail message,
   wherein indicating the online state comprises:
      determining an identity of one or more of the sender or any one other recipient by stripping a domain name from an email address associated with the one or more of the sender or any one other recipient, and
      determining the online state of the one or more of the sender or any one other recipient by performing a reverse look-up with the determined identity of the one or more of the sender or any one other recipient.

32. The computer program of claim 31 wherein the computer readable medium comprises a disc.

33. The computer program of claim 31 wherein the computer readable medium comprises a client device.

34. The computer program of claim 31 wherein the computer readable medium comprises a host device.

35. The computer program of claim 31 further comprising instructions for enabling a graphical user interface based upon the online state.

36. The computer program of claim 35 wherein instructions for enabling a graphical user interface for a first online state differ from instructions for enabling a graphical user interface for a second online state.

37. The computer program of claim 31 wherein the instructions for indicating the online state comprise instructions for indicating the online state of the sender of the e-mail message.

38. The computer program of claim 31 wherein the instructions for indicating the online state comprise instructions for indicating the online state of at least one other recipient of the e-mail message.

39. The computer program of claim 31 wherein the instructions for indicating the online state comprise instructions for indicating the online state of both the sender and at least one other recipient of the e-mail message.

40. The computer program of claim 31 wherein the instructions for indicating the online state comprise instructions for indicating the online state of the sender and every other recipient of the e-mail message.

41. The computer program of claim 31 wherein the instructions for indicating the online state comprise instructions for providing one or more visual indicators to the recipient.

42. A communications apparatus for transferring electronic data between users of a communications system, the apparatus including at least one processor and configured to:
   deliver an e-mail message from a sender to at least one recipient;
   upon opening of the e-mail message by the recipient, indicate on a display, to the at least one recipient, an online state of at least one of the sender and any one other recipient of the e-mail message,
   wherein to indicate the online state comprises:
      determine an identity of one or more of the sender or any one other recipient by stripping a domain name from an email address associated with the one or more of the sender or any one other recipient, and
      determine the online state of the one or more of the sender or any one other recipient by performing a reverse look-up with the determined identity of the one or more of the sender or any one other recipient.

43. The communications apparatus of claim 42 wherein the communications apparatus comprises a client device.

44. The communications apparatus of claim 42 wherein the communications apparatus comprises a host device.

45. The communications apparatus of claim 42 wherein the apparatus is configured to indicate the online state of the sender of the e-mail message.

46. The communications apparatus of claim 42 wherein the apparatus is configured to indicate the online state of at least one other recipient of the e-mail message.

47. The communications apparatus of claim 42 wherein the apparatus is configured to indicate the online state of both the sender and at least one other recipient of the e-mail message.

48. The communications apparatus of claim 42 wherein the apparatus is configured to indicate the online state of the sender and every other recipient of the e-mail message.

49. The communications apparatus of claim 42 wherein the apparatus is configured to indicate the online state by providing one or more visual indicators to the recipient.

50. A communications apparatus for transferring electronic data between users of a communications system, the apparatus including at least one processor and comprising:
  delivering means for delivering an e-mail message from a sender to at least one recipient; and
  indicating means for indicating on a display, to the at least one recipient, an online state of at least one of the sender and any one other recipient of the e-mail message upon opening of the e-mail message by the recipient,
  wherein the indicating means comprises:
    means for determining an identity of one or more of the sender or any one other recipient by stripping a domain name from an email address associated with the one or more of the sender or any one other recipient, and
    means for determining the online state of the one or more of the sender or any one other recipient by performing a reverse look-up with the determined identity of the one or more of the sender or any one other recipient.

51. The communications apparatus of claim 50 wherein the indicating means comprises indicating means for indicating the online state of the sender of the e-mail message.

52. The communications apparatus of claim 50 wherein the indicating means comprises indicating means for indicating the online state of at least one other recipient of the e-mail message.

53. The communications apparatus of claim 50 wherein the indicating means comprises indicating means for indicating the online state of both the sender and at least one other recipient of the e-mail message.

54. The communications apparatus of claim 50 wherein the indicating means comprises indicating means for indicating the online state of the sender and every other recipient of the e-mail message.

55. The communications apparatus of claim 50 wherein the indicating means comprises indicating means for providing one or more visual indicators to the recipient.

* * * * *